United States Patent [19]
Schiel

[11] Patent Number: 5,855,740
[45] Date of Patent: Jan. 5, 1999

[54] PRESS ROLL WITH EXTENDED PRESS SHOE HAVING SUPPORT FORCES CONCENTRATED IN PISTON EDGES

[75] Inventor: Christian Schiel, Heidenheim, Germany

[73] Assignee: Voith Sulzer Papiermaschinen GmbH, Heidenheim, Germany

[21] Appl. No.: 866,086

[22] Filed: May 30, 1997

[30] Foreign Application Priority Data

May 31, 1996 [DE] Germany ............ 196 22 020.3

[51] Int. Cl.⁶ ...................................... D21F 3/08
[52] U.S. Cl. .......................... 162/358.3; 162/361; 492/7
[58] Field of Search .............. 162/358.3, 358.5, 162/361; 492/7

[56] References Cited

U.S. PATENT DOCUMENTS

| | | | |
|---|---|---|---|
| 4,568,423 | 2/1986 | Laapotti | 162/358.3 |
| 5,167,768 | 12/1992 | Cronin | 162/358.3 |
| 5,650,047 | 7/1997 | Meschenmoser | 162/358.3 |

FOREIGN PATENT DOCUMENTS

| | | |
|---|---|---|
| 0066528 | 12/1982 | European Pat. Off. . |
| 0345501 | 12/1989 | European Pat. Off. . |

Primary Examiner—Karen M. Hastings
Attorney, Agent, or Firm—Greenblum & Bernstein, P.L.C.

[57] ABSTRACT

A press roll for treating a material web in a nip formed with an opposing surface is provided. A press shoe extends along the nip and guides a press jacket. Several adjacent force elements disposed along the direction of the roll axis are supported on a stationary carrier. The force elements are preferably each fluid-actuated cylinder/piston units which can bias the press shoe with their movable pistons. The piston of at least one force element and/or an opposing region of the press shoe concentrate support forces in piston edge regions that are disposed opposite one another on different ends of a central piston plane perpendicular to the roll axis.

31 Claims, 5 Drawing Sheets

PRESS ROLL WITH EXTENDED PRESS SHOE HAVING SUPPORT FORCES CONCENTRATED IN PISTON EDGES

CROSS-REFERENCE OF RELATED APPLICATIONS

The present application claims priority under 35 U.S.C.§119 to German Patent Application 196 22 020.3, filed May 31, 1996, the disclosure of which is expressly incorporated by reference in its entirety.

BACKGROUND OF THE INVENTION

1. Field of the Invention

The present invention relates to a press roll for treating a material web in a nip. More particularly, the present invention relates to a press roll for treating material in a nip that has a press shoe which extends along the nip, a press jacket guided via the press shoe, and adjacent force elements (e.g., cylinder/piston units) disposed along an axis of the press roll and supported on a stationary carrier.

2. Description of Background Information

A prior art press roll of this type is shown, for example, in EP 0 345 501 B1. In this prior art press roll, the manufacturing costs are largely dependent on the desired uniformity of line force distributed laterally along the nip over the material web to be treated (typically a paper or cardboard web). If several individual force elements support the press shoe are with a spacing t therebetween along the direction of the roll axis, then a maximum deflection between the force elements is expressed by the equation:

$$f = c \cdot P_L \cdot t^4,$$

where c represents a constant related to the elastic resilience of the press shoe, $P_L$ represents the line force, and t represents the distance between adjacent force elements along the roll axis.

As can be seen from the above equation, minor variations in spacing t can significantly affect the uniform line force distribution, in that line force is reduced at points at which the press shoe sags. Excessive sag does not provide sufficient compression of the material web guided through the nip; indeed, the line force can drop to zero at the midpoint between force elements.

To eliminate sag points, the press roll shown in EP 0 345 501 B1 0uses two parallel rows of force elements that extend along the roll axis, lateral to the material web. Compared with a single row of force elements, the two-row design halves the distance between individual force elements while using the same total support area. While this reduces maximum deflection by reducing spacing t, it also increases the total number of force elements by a factor of four. However, not only are four smaller force elements more expensive than a single larger force element, the assembly of the larger number of force elements increases production time and associated costs. Further, the use of piston rods in the prior art force elements requires a significant amount of space in the radial direction to hold the force elements.

SUMMARY OF THE INVENTION

An object of the present invention is to provide a press roll that distributes line force optimally along the nip and lateral to the material web.

A further object of the invention is to provide a press roll having a compact construction that uses a minimal amount of radial space, requires fewer force elements, and varies the space between force elements according to the length of the roll.

The above objects are attained according to the invention by concentrating the support force of at least one force element and/or an opposing region of the press shoe in piston edge regions adjacent the periphery of the piston. These regions are preferably on opposite sides of a central piston plane that is perpendicular to the roll axis.

As a result, the main supporting force of the force element is not provided centrally as in the prior art, but is rather distributed along the piston edges. The effective span between the force elements is therefore reduced without increasing the number of piston elements. As indicated by the deflection equation above, this reduces the sag of the press shoe between the support points.

In a preferred embodiment, the desired support force is produced by providing the piston and/or the press shoe with at least two discrete, raised contact surfaces spaced apart from each other along the roll axis. The contact surfaces are preferably provided with glued or galvanically deposited slip coating, which contains a layer of a material that has a particularly low friction coefficient in relation to a metallic opposing surface; for example, cloth impregnated with a slip agent, such as polytetrafluoroethylene (PTFE), molybdenum sulfite, polyethylene, lamellar carbon, or galvanically deposited thin films.

Optimal results for the present invention are obtained if the distance between the center of gravity of each of the two discrete contact surfaces (measured along the roll axis) is at least half the space between the center of pistons of adjacent force elements; as such, the distance between the center of gravity of contact surfaces of adjacent pistons is less than or equal to the distance between the center of pistons of adjacent force elements.

To compensate for a greater distance between the contact surfaces of a piston, at least one hydrostatic pocket can be provided. This pocket is preferably provided in the center of the piston, between the contact surfaces, to eliminate sag in the central region.

According to another embodiment of the present invention, an annular hydrostatic pocket, which concentrates the support force near the edge region of the piston, is disposed between the piston and the press shoe. Although the annular hydrostatic pocket is preferably disposed in the piston, it may be disposed in the press shoe.

A respective hydrostatic pocket provided in the piston can communicate via a throttle with the cylinder chamber of the force element. In the alternative, the pocket can receive pressure fluid independent from the cylinder chamber.

If an annular hydrostatic pocket is used, a pressureless pocket can be embedded in the center of the piston. The pressureless pocket is preferably feed through a discharge bore to the outside.

The pistons in the force elements are preferably flat-topped without a piston rod. At least one elastic support also preferably prevents each piston from rotating. This support is preferably eccentric in relation to the piston axis, and disposed between the piston and the stationary carrier or the cylinder bottom.

According to an embodiment of the invention, there is provided a press roll for treating a material web having a nip formed with an opposing surface. A press shoe extends along the nip. A press jacket is guided by the press shoe. A plurality of force elements are disposed along a longitudinal axis of a stationary carrier. Either the press shoe or at least one force element of the plurality of force elements concentrates support forces between the at least one force element and the press shoe substantially in edge regions of the at least one force element disposed on opposite sides of a central plane of the at least one force element perpendicular to the longitudinal axis.

According to a feature of the above embodiment, the one of the press shoe and the piston of the at least one force element includes at least two discrete, raised contact surfaces spaced apart from each other.

According to a further feature of the above embodiment, the at least two contact surfaces are replaceable contact plates.

According to a still further feature of the above embodiment, the at least two contact surfaces are provided with a slip coating that has a lower friction coefficient than metal.

According to a still further feature of the above embodiment, a distance between the center of gravity of each of the at least two discrete contact surfaces is at least half the distance between the center of adjacent pistons of the plurality of force elements. Similarly, an axial distance between the center of gravity of adjacent contact surfaces of adjacent ones of the plurality of force elements is less than or equal to half of the distance.

According to a still further feature of the above embodiment, a hydrostatic pocket is disposed between the at least two contact surfaces, substantially centered on the piston of the at least one force element.

According to a still further feature of the above embodiment, a flexion strength of the piston of the at least one force element is at least that of the press shoe.

According to a still further feature of the above embodiment, an annular hydrostatic pocket is disposed in the press shoe to concentrate support force in the regions.

According to a still further feature of the above embodiment, at least one hydrostatic pocket is provided in the piston of the at least one force element which communicates with a cylinder pressure chamber of the at least one force element via a throttle.

According to a still further feature of the above embodiment, the at least one hydrostatic pocket can receive pressure fluid independently of the cylinder pressure chamber.

According to a still further feature of the above embodiment, at least one hydrostatic pocket is associated with the piston of the at least one force element, and can receive fluid through a pressure fluid line that passes through the stationary carrier.

According to a still further feature of the above embodiment, the at least one hydrostatic pocket includes at least one ring, disposed between the piston and press shoe, which is elastically biased against the press shoe.

According to a still further feature of the above embodiment, the at least one hydrostatic pocket is an annular hydrostatic pocket which produces support force along the regions. The at least one ring includes inner and outer sealing rings, elastically biased against the opposing surface.

According to a still further feature of the above embodiment, a pressureless pocket is encircled by the annular hydrostatic pocket. A discharge bore feeds the pressureless pocket from outside of the at least one force element.

According to a still further embodiment of the invention, the piston of the at least one force element is a flat-topped piston without a piston rod.

According to a still further embodiment of the invention, the cylinder of each of the plurality of force elements is hollow, and sealed to the stationary carrier to form a pressure chamber for the piston of each of the plurality of force elements.

According to a still further embodiment of the invention, the piston cannot rotate about its axis.

According to a still further embodiment of the invention, at least one elastic support, eccentric in relation to the axis, is disposed between the piston and one of the stationary carrier and a bottom of the cylinder, which prevents the piston from rotating.

According to a still further embodiment of the invention, the elastic support is a leaf spring with a hammer head. The hammer head is inserted into a piston-end bore while an opposite end of the leaf spring is fixed to the one of the stationary carrier and the bottom.

According to a still further embodiment of the invention, the elastic support is an elastic rod inserted loosely at one end into a piston-end bore and inserted at its other end into a bore provided in the one of the stationary carrier and the bottom.

According to a still further embodiment of the invention, each of the plurality of force elements have a circular cylindrical cross section.

According to another embodiment of the invention, a press roll for treating a material web having a nip formed with an opposing surface is provided. A press shoe extends along the nip. A press jacket is guided by the press shoe. A plurality of pistons are disposed along a roll axis of the press roll, and apply pressure to the press shoe to press the press jacket against the opposing surface. A plurality of holders hold the plurality of pistons, respectively. At least one of the plurality of pistons applies more pressure per unit area in at least one region along the perimeter of the piston then in a central region of the piston.

According to a feature of the above embodiment, the at least one region comprises two surfaces on opposite sides of a plane. The plane is perpendicular to the roll axis.

According to a further feature of the above embodiment, the two surfaces are raised plates.

According to a still further feature of the above embodiment, the distance between a center of gravity of each of the two surface is greater than half a distance between the center of adjacent pistons along the roll axis.

According to a still further feature of the above embodiment, a hydrostatic pocket is formed between the two surfaces on the piston.

According to a still further feature of the above embodiment, the hydrostatic pocket is centered on the piston.

According to a still further feature of the above embodiment, the at least one region includes a circle about the center of the piston. An annular hydrostatic pocket is disposed in the circle.

According to yet another embodiment of the invention, a press roll for treating a material web having a nip formed with an opposing surface is provided. A press shoe extends along the nip. A press jacket is guided by the press shoe. A plurality of force elements are disposed along a longitudinal axis of a stationary carrier. Either the press shoe or at least one force element of the plurality of force elements concentrating support forces between the at least one force element and the press shoe substantially in a circular edge region of the at least one force element.

According to a feature of the above embodiment, each of the plurality of force elements include a piston inserted into a cylinder, and the edge region is along a periphery of the piston of the at least one force element.

The invention is explained in detail below in conjunction with exemplary embodiments and with reference to the drawings. Other advantageous embodiments of the press roll according to the invention are disclosed in the appended claims.

BRIEF DESCRIPTION OF THE DRAWINGS

The present invention may be further described in the detailed description which follows, with reference to the noted drawing figures illustrating the preferred embodiment of the present invention, and wherein.

DETAILED DESCRIPTION OF THE PREFERRED EMBODIMENTS

Figure 1:
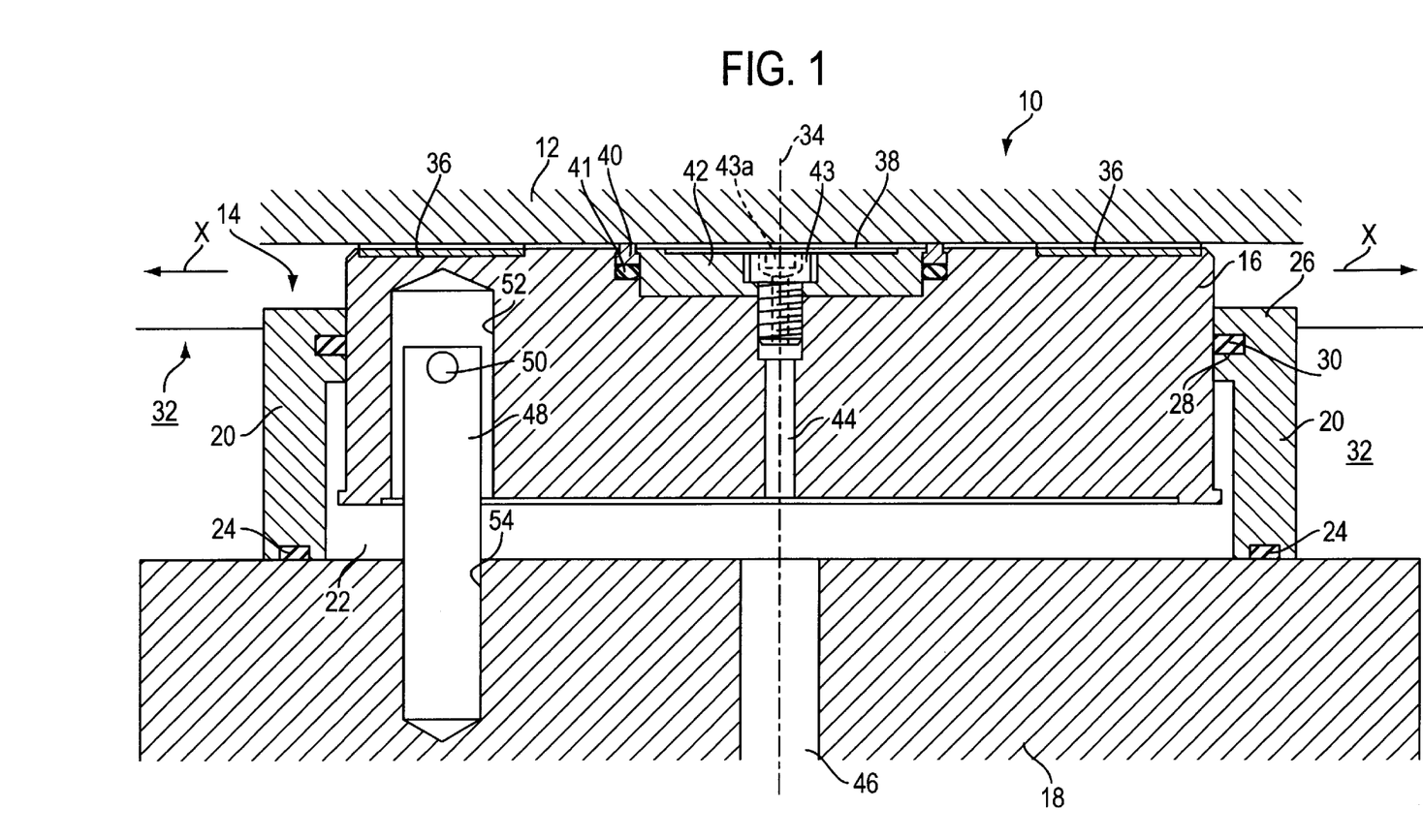
FIG. 1 is a schematic view of an embodiment of a force element of the present invention.
Figure 2:
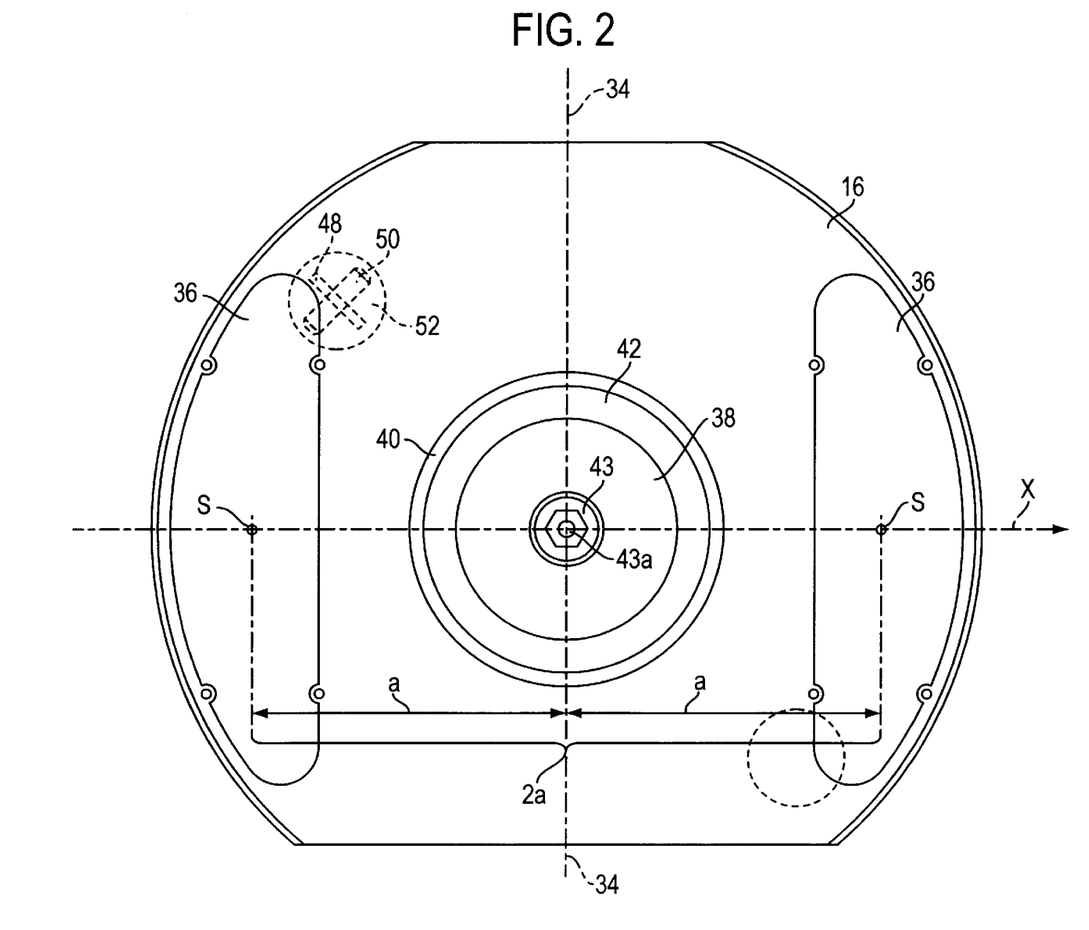
FIG. 2 is a top view of the force element shown in FIG. 1.

Referring now to FIGS. 1 and 2, a section of press roll 10 treats a material web (e.g., a paper or cardboard web) in a nip (not shown) having an opposing surface.

The press roll 10 includes a press shoe 12 that extends along the nip, a press jacket (not shown in FIGS. 1 and 2) guided via the press shoe 12, and several force elements 14 (only one is shown in FIGS. 1 and 2). Force elements 14, which are fluid controlled cylinder/piston units, are secured to a stationary carrier 18, and positioned equidistant along a roll axis X. Pistons 16 apply pressure to the press jacket against the opposing surface (which can be a counter roll).

Piston 16, which is preferably a flat-topped piston that does not use a piston rod, is guided in a shallow, hollow cylinder 20 of force element 14. Cylinder 20 has an inner collar 26 extending from its top portion. Collar 26 has an annular groove 28 along its inner radius that supports an annular seal 30. The outer circumference of piston 16 fits snugly within annular seal 30 to form a top pressure seal. Similarly, an annular seal 24 seals cylinder 20 at its underside to stationary carrier 18. Annular seals 24 and 30 form a pressure chamber 22 for piston 16. Cylinder 20 is inserted into a groove 32 in carrier 18, which extends along roll axis X.

In the first embodiment of the invention, the force applied by piston 16 of force element 14 is concentrated in piston edge regions disposed on opposite sides of a central piston plane 34, which is perpendicular to the roll axis X. As best seen in FIG. 2, two discrete, raised contact surfaces 36 (preferably removable contact plates) having kidney shapes are positioned on the top of piston 16, on opposite sides of central piston plane 34. Contact surfaces 36 are preferably provided with a galvanically deposited slip coating.

Measured along roll axis X, distance a represents the space between central piston plane 34 and the center of gravity S of contact surfaces 36. The distance 2a between the center of gravity S of contact surfaces 36 is preferably at least half of distance t (the space between the center of adjacent force elements 14) so that a distance s between the center of gravity S of contact surfaces 36 of adjacent force elements 14 is less than half the piston spacing t.

Piston 16 preferably has a high flexion strength along roll axis X, and is preferably at least as great as the flexion strength of the press shoe 12.

A hydrostatic pocket 38 is centrally positioned on piston 16 between contact surfaces 36. Hydrostatic pocket 38 includes a ring 40 held in the pocket by a lip of a securing ring 42 attached to piston 16 by a bolt 43. An annular seal 41 elastically biases ring 40 against press shoe 12.

The hydrostatic pocket 38 communicates with the pressure chamber 22 of the force element 14 through a bore 44 in piston 16 and a bore 43a in bolt 43, which preferably acts as a throttle. Pressure chamber 22 receives pressure fluid via a conduit 46 in carrier 18, which communicates with a pressure fluid line that passes through the carrier 18. An increase in the pressure in bore 43a increases the pressure in the area encircled by ring 40. This counteracts any sag adjacent the center of piston 16.

Consequently, pressure chamber 22 both acts on the piston 16 and supplies the hydrostatic pocket 38 with pressure fluid. In the alternative, hydrostatic pocket 38 can be fed independently of the pressure chamber 22.

Piston 16 is prevented from rotating by an elastic support, eccentric in relation to the piston axis, disposed between piston 16 and the stationary carrier 18. In the preferred embodiment, the elastic support is a leaf spring 48 with a hammer head 50. Hammer head 50 is inserted into a piston-end bore 52, while the other end of spring 48 is inserted with negative allowance into a bore 54 of carrier 18. In FIG. 1, the leaf spring 48 is shown rotated by 45°.

In the present embodiment, force element 14, including piston 16 and cylinder 20, preferably have a cylindrical cross section. However, other cross sections are within the scope and spirit of the present invention.

Figure 3:
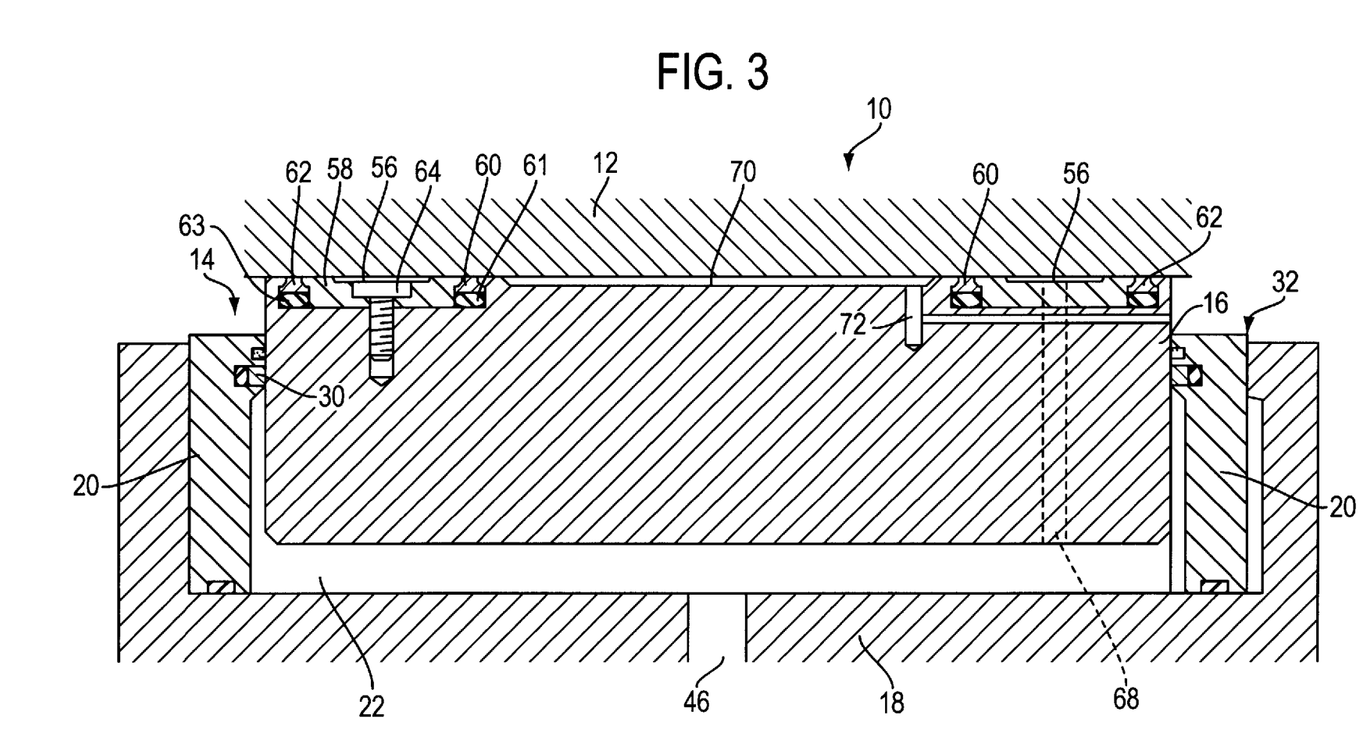
FIG. 3 is a schematic view of a force element of another embodiment of the present invention.
Figure 4:
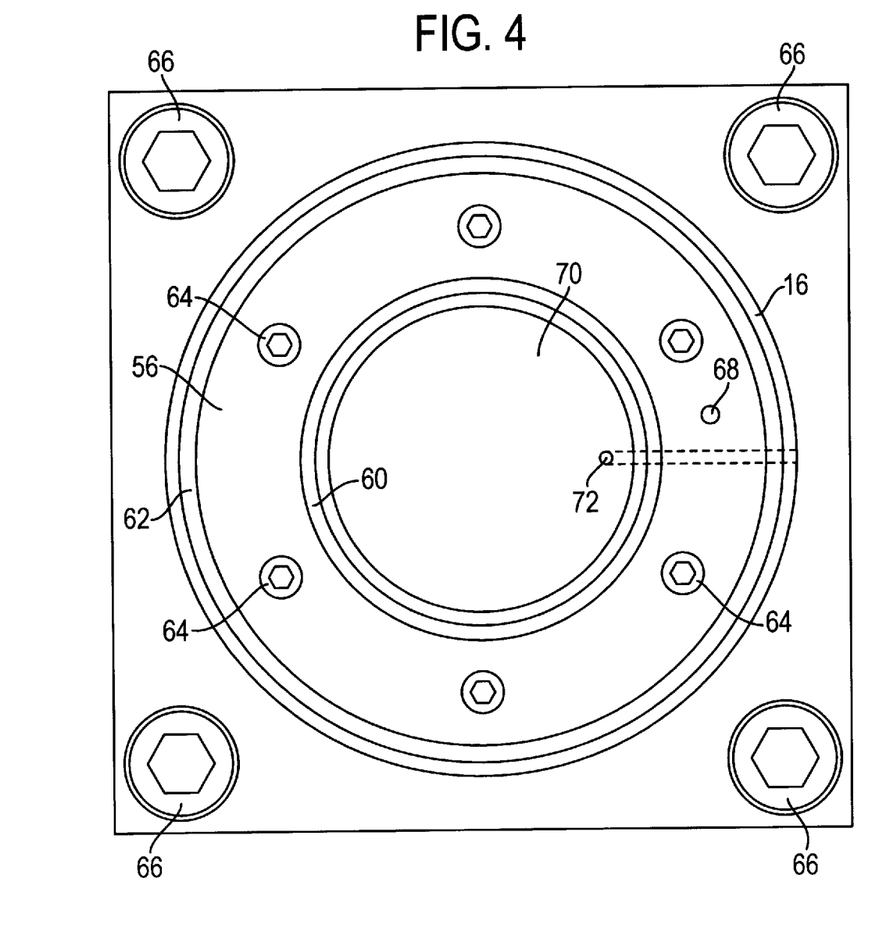
FIG. 4 is a top view of the force element shown in FIG. 3.

Referring now to FIGS. 3 and 4, another embodiment of the press roll 10 is shown, in which like elements are designated by like numerals. This embodiment differs from the previous embodiment in that contact surfaces 36 have been removed in favor of an annular hydrostatic pocket 56. Hydrostatic pocket 56 is disposed in piston 16, and concentrates the support force about the periphery of piston 16. Inner and outer sealing rings 60 and 62, which are held against an inner sealant ring 61 by a securing ring 58, seal annular hydrostatic pocket 56. Securing screws 64 attach ring 51 to piston 16, while screws 66 attach cylinder 20 to carrier 18.

As best seen in FIG. 3, annular hydrostatic pocket 56 communicates with pressure chamber 22 via a bore 68, which preferably acts as a throttle.

Inside annular hydrostatic pocket 56, a pressureless pocket 70 is disposed in the central region of the piston 16. Discharge bore 72 feeds pocket 70 from the outside.

Figure 5:
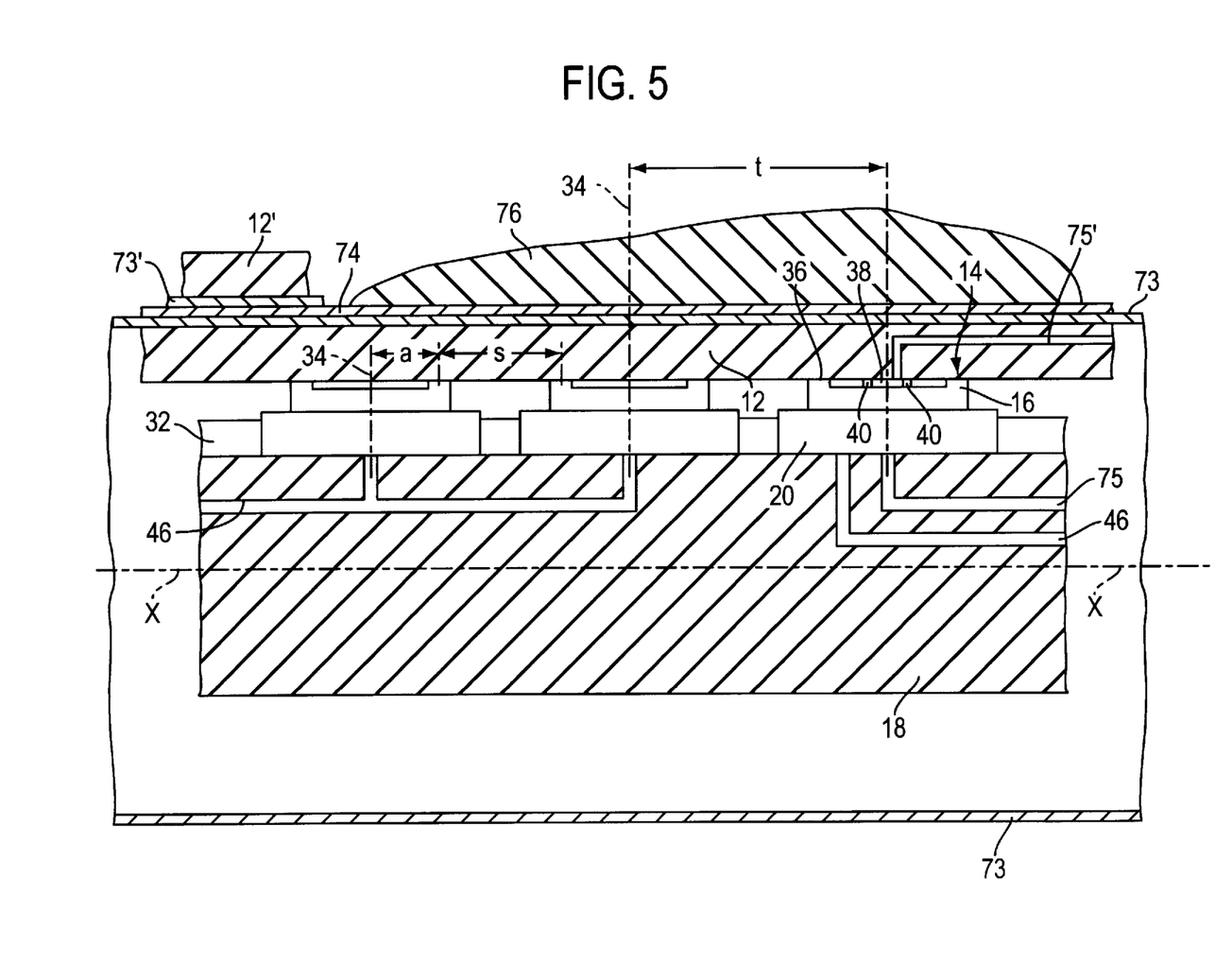
FIG. 5 is a longitudinal view of a press roll according to the present invention with three adjacent force elements.

Referring now to FIG. 5, an embodiment with three force elements 14 is shown. Carrier 18 supports three adjacent force elements 14 that press shoe 12 against a press jacket 73. Press jacket 73 revolves around the carrier 18 and serves as the surface upon which the paper web rests (alone, or as a sandwich with a supporting felt belt 74). The pressing force of force elements 14 counteracts a supporting force of the opposing element 76 (preferably a rotating roller, or corresponding press shoe 12' with a press jacket 73'). Further, a pressure fluid supply line 75 or 75' is provided to the hydrostatic pocket 38 independent of the line 46.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and amended, without departing from the scope and spirit of the invention in its aspects. although the invention has been described herein with reference to particular means, materials and embodiments, the invention is not intended to be limited to the particulars discloses herein; rather, the invention extends to all functionally related equivalent structures, methods, and uses, such as are within the scope of the appended claims.

What is claimed:

1. A press roll for treating a material web having a nip formed with an opposing surface, comprising:
    a press shoe extending along said nip;
    a press jacket guided by said press shoe;
    a plurality of force elements disposed along a longitudinal axis of a stationary carrier;
    one of said press shoe and at least one force element of said plurality of force elements being structured and arranged for concentrating support forces between said at least one force element and said press shoe substantially in edge regions of said at least one force element disposed on opposite sides of a central plane of said at least one force element perpendicular to said longitudinal axis.

2. The press roll of claim 1, wherein each of said plurality of force elements includes a piston inserted into a cylinder, and said edge regions are along a periphery of said piston of said at least one force element.

3. The press roll of claim 2, wherein said one of said press shoe and said piston of at least one force element includes at least two discrete, raised contact surfaces spaced apart from each other.

4. The press roll of claim 3, wherein said at least two contact surfaces are replaceable contact plates.

5. The press roll of claim 3, wherein said at least two contact surfaces are provided with a slip coating that has a lower friction coefficient than metal.

6. The press roll of claim 3, wherein a distance between the center of gravity of each of said at least two discrete contact surfaces is at least half the distance between the center of adjacent pistons of said plurality of force elements, and an axial distance between the center of gravity of adjacent contact surfaces of adjacent ones of said plurality of force elements is less than or equal to half of said distance.

7. The press roll of claim 3, further comprising a hydrostatic pocket disposed between said at least two contact surfaces, substantially centered on said at least one force element.

8. The press roll according to claim 2, wherein a flexion strength of said piston of said at least one force element is at least that of said press shoe.

9. The press roll according to claim 1, further comprising an annular hydrostatic pocket disposed in said force-element to concentrate support force in said regions.

10. The press roll of claim 1, further comprising at least one hydrostatic pocket provided in said at least one force element which communicates with a cylinder pressure chamber of said at least one force element via a throttle.

11. The press roll according to claim 10, wherein said at least one hydrostatic pocket can receive pressure fluid independently of said cylinder pressure chamber.

12. The press roll of claim 1, further comprising at least one hydrostatic pocket associated with said at least one force element, and which can receive fluid through a pressure fluid line that passes through said stationary carrier.

13. The press roll of claim 12, wherein said at least one hydrostatic pocket includes at least one ring, disposed between said at least one force element and said press shoe, which is elastically biased against said press shoe.

14. The press roll of claim 13, wherein said at least one hydrostatic pocket is an annular hydrostatic pocket which produces support force along said regions, and said at least one ring includes inner and outer sealing rings, elastically biased against said opposing surface.

15. The press roll of claim 14, wherein a pressureless pocket is encircled by said annular hydrostatic pocket, and a discharge bore feeds said pressureless pocket from outside of said at least one force element.

16. The press roll of claim 2, wherein said piston of said plurality of force elements is a flat-topped piston without a piston rod.

17. The press roll of claim 2, wherein said cylinder of each of said plurality of force elements is hollow, and sealed to said stationary carrier to form a pressure chamber for said piston of each of said plurality of force elements.

18. The press roll of clam 2, wherein said piston cannot rotate about its axis.

19. The press roll of claim 18, further comprising at least one elastic support, eccentric in relation to said axis and disposed between said piston and one of said stationary carrier and a bottom of said cylinder, which prevents said piston from rotating.

20. The press roll of claim 19, wherein said elastic support is a leaf spring with a hammer head, said hammer head being inserted into a piston-end bore while an opposite end of said leaf spring is fixed to said one of said stationary carrier and said bottom.

21. The press roll of claim 19, wherein said elastic support is an elastic rod inserted loosely at one end into a piston-end bore and inserted at its other end into a bore provided in said one of said stationary carrier and said bottom.

22. The press roll of claim 1, wherein each of said plurality of force elements have a circular cylindrical cross section.

23. A press roll for treating a material web having a nip formed with an opposing surface, comprising:
    a press shoe extending along said nip;
    a press jacket guided by said press shoe;
    a plurality of pistons disposed along a roll axis of said press roll, which apply pressure to said press shoe to press said press jacket against said opposing surface;
    a plurality of holders which hold said plurality of pistons, respectively;
    at least one of said plurality of pistons being structured and arranged for applying more pressure per unit area in at least one region along the perimeter of said piston than in a central region of said piston.

24. The press roll of claim 23, wherein said at least one region comprises two surfaces on opposite sides of a plane, said plane being perpendicular to said roll axis.

25. The press roll of claim 24, wherein said two surfaces are raised plates.

26. The press roll of claim 24, wherein a distance between a center of gravity of each of said two surface is greater than half a distance between the center of adjacent pistons along said roll axis.

27. The press roll of claim 23, further comprising a hydrostatic pocket formed between said two surfaces on said piston.

28. The press roll of claim 27, wherein said hydrostatic pocket is centered on said piston.

29. The press roll of claim 23, wherein said at least one region includes a circle about said center of said piston, and an annular hydrostatic pocket is disposed in said circle.

30. A press roll for treating a material web having a nip formed with an opposing surface, comprising:

a press shoe extending along said nip;

a press jacket guided by said press shoe;

a plurality of force elements disposed along a longitudinal axis of a stationary carrier;

one of said press shoe and at least one force element of said plurality of force elements being structured and arranged for concentrating support forces between said at least one force element and said press shoe substantially in a circular edge region of said at least one force element.

31. The press roll of claim 30, wherein each of said plurality of force elements include a piston inserted into a cylinder, and said edge region is along a periphery of said piston of said at least one force element.

* * * * *